J. W. LYTTON.
BOILER FEED WATER REGULATOR.
APPLICATION FILED JUNE 30, 1911.
1,044,676.
Patented Nov. 19, 1912.
2 SHEETS—SHEET 1.
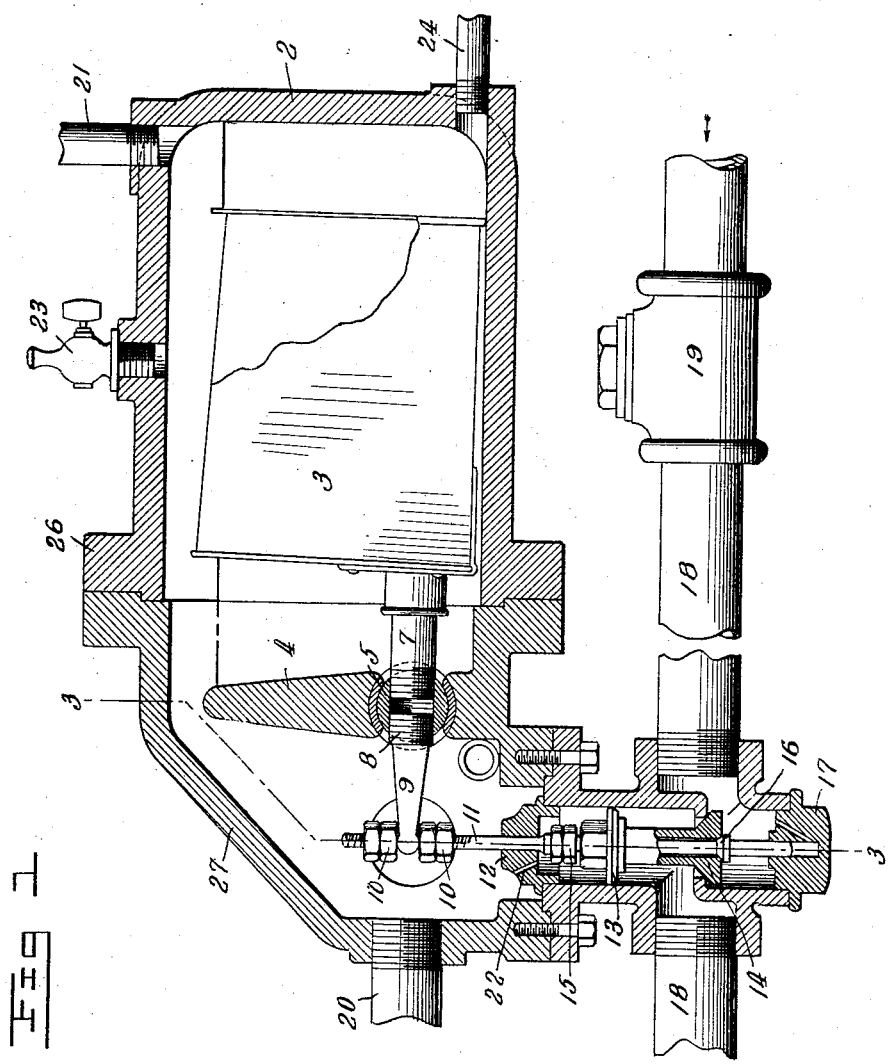
Inventor
Jarard W. Lytton J. W. LYTTON.
BOILER FEED WATER REGULATOR.
APPLICATION FILED JUNE 30, 1911.
1,044,676.
Patented Nov. 19, 1912.
3 SHEETS—SHEET 2.
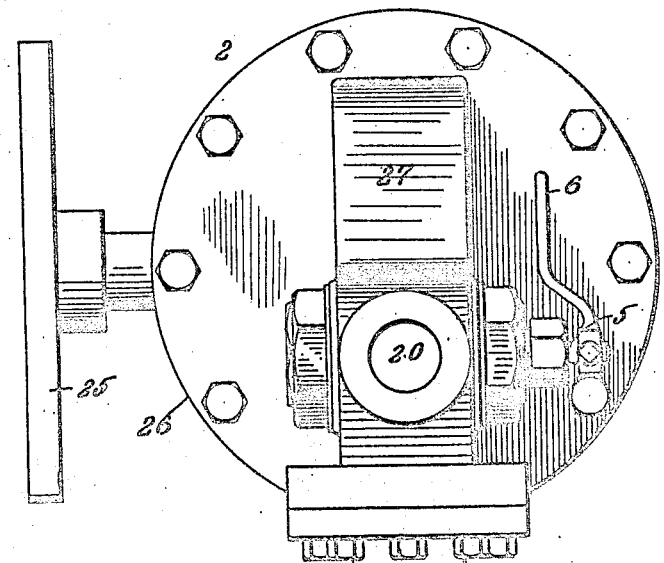
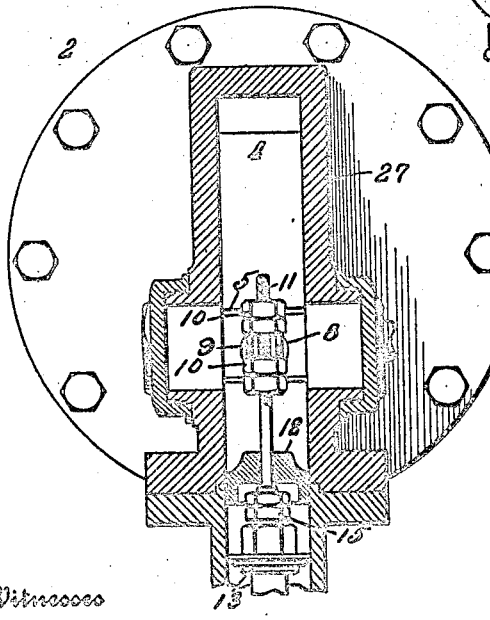
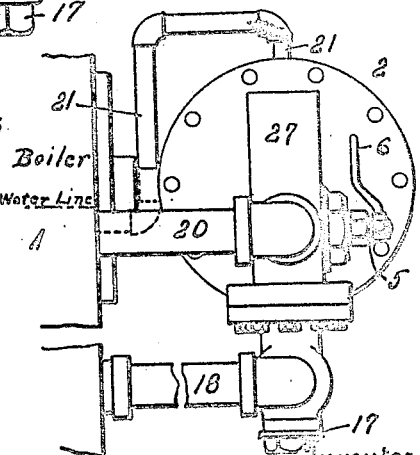
Inventor
Jerard W. Lytton
Witnesses
By Meyers, Cushman &
Attorney

UNITED STATES PATENT OFFICE.

JARARD W. LYTTON, OF FRANKLIN, VIRGINIA, ASSIGNOR TO LYTTON MANUFACTURING CORPORATION, OF FRANKLIN, VIRGINIA, A CORPORATION OF VIRGINIA.

BOILER-FEED-WATER REGULATOR.

1,044,676.  Specification of Letters Patent.  Patented Nov. 19, 1912.

Application filed June 30, 1911. Serial No. 636,308.

*To all whom it may concern:*

Be it known that I, JARARD W. LYTTON, a citizen of the United States, residing at Franklin, in the county of Southampton and State of Virginia, have invented new and useful Improvements in Boiler-Feed-Water Regulators, of which the following is a specification.

The present invention relates to feed water regulators for boilers, and has for its object to provide a regulator which will give a close control of the feed from the supply, the arrangement being such that a very sensitive action of the regulator is secured and one which is equated within small variations.

The regulator which I have invented is of such character that it may be readily installed in connection with any type of boiler and any type of supply, and after installation will maintain its efficiency for an indefinite period, the coöperating parts being few and simple; and, furthermore, since it does not depend for its operation on a closed or air tight float, the annoyance of punctured or corroded floats which are ineffective since their buoyancy is destroyed, is done away with. Furthermore, the operation of the feed valve is such that its opening and closing movements are secured with but slight expenditure of power and the annoyance of sticking valves or valves which are difficult to operate under variations in pressure between the supply side and the feed side are done away with.

In the drawings which accompany and form a part of this case, I have illustrated one embodiment of my invention. This showing is merely illustrative and is in no sense restrictive, for it will be obvious on consideration of this disclosure that the construction may be widely varied without departing from the principle, and all such mechanical expedients would, of course, fall within the range of my invention.

In these drawings—Figure 1 is a central longitudinal section of a regulator embodying the principles of my invention. Fig. 2 is an end view looking from the left, Fig. 1. Fig. 3 is a cross sectional view on the line 3—3 of Fig. 1. Fig. 4 is an elevation of the regulator and a steam boiler on a reduced scale showing the connection between the two.

Referring to the drawings by numerals, like numbers illustrating like parts in the several views, 2 denotes a closed chamber which may be very properly termed the float chamber since it contains the open topped float 3, said open topped float being trunnioned in suitable bearings in a web or wall 4, which divides the chamber 2 into two parts, which connect only over the top of the wall 4. The trunnion support 5 for the float 3 may be of any suitable construction, that shown in the present instance being a transverse rocking shaft, one end of which projects outside of the casing 2, where it is connected with a handle 6 by means of which the trunnion may be manually oscillated if desired. The trunnion 5 is connected with the float by means of a pipe connection 7 so that open communication is obtained from the float 3 through the trunnion 5 into the chamber 2 on the other side of the wall 4. This communicating pipe is shown in the present instance as made of two sections for purposes of adjustment, the section 8 being provided at its forward end with a suitable valve stem connection such as the fork 9, which engages adjustable nuts 10 threaded to the valve stem.

The valve stem 11 drops through a head 12 in a piston chamber formed in the casing, which piston chamber contains a piston 13 connected with the feed valve proper 14, this piston and feed valve having a slight play on the stem 11 between the stop nuts 15 and a preliminary pressure valve 16 on the valve stem, the lower end of the stem dropping into an alinement socket in the bottom nut 17.

From the foregoing it will be seen that the rising and falling movements of the float 3 will reciprocate the valve stem 11 and open or close the feed valve 14 according to the direction of movement of the valve controlling float.

The valve 14 controls a port in the feed pipe 18, said feed pipe connecting at its supply end with a suitable pump or other supply (not shown), a non-return check valve 19 being placed in the feed pipe on the supply side of the feed valve 14

At its other end the said feed valve 14 delivers to the boiler so that when the feed valve is open the feed water will pass from the supply by way of pipe 18 past the feed valve 14 to the boiler.

In order that the control of the feed valve 14 may be automatically dependent on the water level in the boiler, I connect the chamber 2 on one side of the wall 4 with the boiler by means of a pipe 20, this connection 20 being made at a point just below the maximum or desired water line to be maintained in the boiler, that is to say the maximum water line will be at or slightly above the top of said pipe, and since this connection 20 communicates with the interior of the float 3 through the open trunnion pipes 7 and 8, it will be obvious that under equal pressure the same level will be maintained in the boiler and in the float 3. On the opposite or float side of the wall 4, I connect the chamber 2 with the boiler by means of a connection 21 which enters the boiler at the same level as the pipe 20, and serves to maintain at the proper time, an equalization of pressure in the boiler and chamber.

With this construction, the operation of the device is as follows: Let it be assumed that the boiler has just been filled to the maximum or desired level, indicated by the line A with relation to the chamber 2, thus covering the boiler ends of the pipes 20 and 21. Communication being cut off from the steam space of the boiler, the steam in the chamber 2 and pipe 21 will condense, tending to create a vacuum in these parts which will immediately fill with water from the boiler through the pipes 20 and 21, overflow into the float 3 and cause the latter to sink to the bottom of the chamber 2 as represented in Fig. 1, closing the feed water valve 14. The receptacle 2 will remain filled until sufficient evaporation in the boiler has lowered the water level below the end of the pipe 21 when steam will immediately pass into said receptacle and equalize the pressure therein with that in the boiler. The water in the float 3 and on the valve side of the chamber 2 will immediately fall to the level of the water in the boiler, while that on the float side of the said chamber will sink only to the top of the float. The float being thus lightened, will rise in the substantially constant volume of water on the float side of the chamber 2, which lifting of the float 3 will, through the trunnion connection with the feed valve 14, open the feed valve and permit the pump or other supply to again deliver to the boiler, and this delivery will continue until the water in the boiler has reached the maximum or desired level whereupon steam will be cut off from the chamber 2, a vacuum formed, water once more fill the chamber, and overflow the open topped float 3, sinking it to its normal position and closing the feed valve 14.

In order to balance the feed valve 14 the piston 13 is provided. The chamber of said piston communicates by means of passage 22, through the piston chamber head 12, with the valve side of the chamber 2, and is exposed on its under side to boiler pressure from the feed pipe 18, so that no opposing pressures to disturb the movements in either direction of the float 3 and the feed valve are present, and in order that the supply pressure coming from the pipe 18 on the supply side of the valve 13 may be promptly balanced on both sides of the feed valve, the preliminary valve 16 heretofore mentioned is provided, which preliminary valve has a slight initial movement as the float rises, or the trunnion lever is thrown down, said preliminary valve 16 permitting the supply pressure to flow through the feed valve stem and above the piston 13, whereupon the feed valve is at once balanced, and but slight float exertion is required to open it.

From what has been said, it will be clear that fluctuations in the height of water in the boiler will be slight, varying only from the top, or a slight distance above the top of the pipe connections 20 and 21 to a point just low enough to admit steam into said pipe 21, a height easily within one half an inch. With such a slight fall of water in the boiler it is evident only a small quantity of cold water can enter it at each operation of the regulator, thus producing a more efficient and economical boiler by reducing the quantity of fuel necessary to keep it in proper working condition.

It may sometimes happen that the valve and float should be manipulated manually, and it will be clear that through the handle 6 on the trunnion stem this may be done regardless of the internal conditions in the chamber 2.

The chamber 2 will preferably be provided at a suitable place with an air cock 23 to relieve the chamber 2 from trapped air when the apparatus is started, and I preferably provide as well a blow off connection 24, which will take care of the sediment which may collect from time to time within the chamber, and permit the parts to be kept in proper condition and free from corroding.

Of course the regulator may be supported in any suitable manner, but I have shown a hanger 25 secured to the bolt rim 26 of the chamber 2 for supporting the regulator in its proper relation.

For economy of construction and space I have formed the chamber 2 as shown in two parts, the float side of the chamber 2 being preferably cylindrical while the valve side 27 of the chamber is, as shown, approximately rectangular and bolted to the chamber 2, the front of the valve casing 27 sloping downward to the boiler connection 20 and being only of such width as will give a proper container for the valve parts.

What I claim is:—

1. A feed water regulator comprising two chambers connected only at the top, an open float in one of said chambers adapted to fill with water and discharge the same into the other chamber, a boiler feed-water connection, a valve controlling the same operated by the movement of said float, and a connection from each of said chambers adapted to open into a boiler at such points as to be closed by water against the passage of steam when the water rises to its maximum level.

2. A feed water regulator comprising a receptacle divided by a partition into two connected chambers, one of which is a float chamber, a steam connection from the float chamber adapted to open into a steam boiler at such a point as to be closed by water in the boiler to the passage of steam when said water reaches its maximum level, a water connection from the other chamber adapted to open into said boiler, a feed water connection for the boiler, a valve in said feed water connection, and a float in the float chamber adapted to open and close said valve.

3. In combination with a steam boiler, a feed water regulator comprising a receptacle containing two connected chambers, one of which is a float chamber, a steam connection from a boiler to said float chamber adapted to be closed by water in the boiler to the passage of steam when said water in the boiler rises to the maximum level, a connection between the other chamber and the boiler through which water from the boiler may fill said receptacle when steam is cut off from the float chamber and condenses therein, a feed water connection to the boiler, a valve in said feed water connection, an open float in said float chamber adapted to operate said valve by the rise and fall of the float due to the filling with water and emptying of said receptacle.

4. In combination with a boiler, a feed water regulator comprising a receptacle divided by a partition into two connected chambers, one of which is a float chamber normally filled with water nearly to the top, a steam connection between the float chamber and a steam boiler, a water connection between the other chamber and said boiler both connections adapted to be closed by water in the boiler to the passage of steam when said water in the boiler rises to the maximum level, whereby steam in said receptacle condenses and the receptacle fills with water from the boiler, a feed water connection to said boiler, a valve in said feed water connection, and an open float adapted to sink in the float chamber when the receptacle fills with water thereby closing the feed valve, and rise in the float chamber after discharging its contents outside the float chamber into the other chamber to open the feed valve when the steam connection is opened by the lowering of the water level in said boiler.

5. In combination with a steam boiler, a feed water regulator comprising a receptacle, a float chamber therein opening at its top into said receptacle and normally filled with water nearly to the top, a water connection between a steam boiler and said receptacle, a steam connection between said float chamber and said boiler, both connections adapted to be closed by water in the boiler when said water in the boiler rises to maximum level, whereupon the steam in the receptacle condenses and the receptacle fills with water from the boiler, a feed water connection to said boiler, a valve in said feed water connection, and an open float adapted to fill and sink when the receptacle fills thereby closing said feed valve, and to empty and rise in said float chamber and open said valve upon the reëntrance of steam into the receptacle when the water level in said boiler falls.

6. A feed water regulator comprising a receptacle divided into two chambers communicating only at the top, a connection from each chamber for attachment to a steam boiler at the maximum water level in said boiler, a feed water connection, a balanced valve controlling the feed water connection, an open float adapted to fill and sink contained within one of said chambers, a hollow trunnioned float stem through which stem said float empties at the proper time into the other chamber, and means connecting said float stem to the balanced valve for operating said valve.

7. A feed water regulator comprising a receptacle, a diaphragm therein dividing it into two chambers connected at the top, an open float in one of said chambers adapted to fill and sink, a tubular stem connected to said float trunnioned in said diaphragm and opening into the other chamber, a feed water connection for a boiler, a balanced valve controlling the feed water connection, means for causing said balanced valve to operate through the movement of the float, and a connection from each of said chambers adapted to open into the boiler at the maximum water level and to be closed against the passage of steam when the water rises to said level.

8. A feed water regulator comprising a receptacle divided into two chambers by a diaphragm extending nearly to the top of said receptacle, an open float in one chamber adapted to fill and discharge its contents into the other chamber, a balanced valve controlling the admission of feed water to a boiler, means connecting said valve to said float and a connection from each chamber adapted to open into the boiler at the maximum water line.

9. A feed water regulator comprising a receptacle, a diaphragm in said receptacle extending nearly to the top and dividing it into two connected chambers, an open float in one chamber mounted on a tubular float stem trunnioned in said diaphragm, said float adapted to rise to the top of the receptacle, fill and sink to the bottom of the same and discharge through said stem into the other chamber, a valve and a piston mounted on a common stem, a rod for operating said valve and piston passing through a passageway in said parts, a valve on said rod for closing said passageway and a stop also on said rod for permitting a slight independent movement of said rod, means for connecting said float and rod, and connections from each chamber adapted to open into a boiler at the maximum water level.

10. A feed water regulator comprising a receptacle divided into two chambers connected at the top of said receptacle, a valve casing through which feed water passes adjacent one of said chambers, a balanced valve in said casing, a rod for operating said valve in one direction passing through a passageway therein into the adjacent chamber, a preliminary pressure valve on said rod for closing said passageway, a limiting stop also on said rod, a connection from said chamber adapted to open into a boiler at the maximum water line, an open float in the other chamber having a float stem trunnioned to permit movement of said float and made hollow to discharge water from the float into the chamber other than that containing the float, means connecting said float stem to said rod for operating it, and a connection from the float chamber adapted to open into the boiler at the maximum water level.

11. A feed water regulator comprising a receptacle divided into two chambers connected at the top of said receptacle, a float in one of said chambers, a float stem trunnioned to permit rise and fall of said float and made tubular to connect said float with the other chamber, a valve casing forming a part of the feed water supplying means adjacent said other chamber, a balanced valve in said valve casing operated by said float stem, and a preliminary pressure valve operative before the balanced valve to establish an equalizing pressure on said latter valve.

12. A feed water regulator comprising a chamber normally containing water at a substantially constant height, an open float in said chamber capable of being emptied and filled with water so that it may rise a predetermined distance in the water in the chamber, fill, and sink therein, a second chamber into which the float empties connected at its top to the first chamber, and means adapted to connect both chambers to a boiler at substantially its maximum water line whereby an equal water level is maintained in the boiler, second chamber, and float, when the pressures in the boiler and receptacle are equal.

13. A feed water regulator comprising a chamber normally containing water at a substantially constant height, an open float in said chamber capable of being emptied and filled with water so that it may rise a predetermined distance in the water in said chamber, fill and sink therein, a second chamber in communication at its top with the top of the first chamber into which second chamber the float empties, a valve in the feed water supplying means, a balancing piston connected by a stem to said valve, a rod adapted to operate said valve and slidable freely through a passageway in said valve piston and stem and provided with a preliminary pressure valve for closing the passageway, and a stop, and means connecting said rod to the float for opening said valves.

14. A feed water regulator comprising two chambers connected at their tops, an open float in one of said chambers, a hollow trunnioned valve stem connecting the float to the other chamber, a feed water supply, a valve casing forming a part thereof provided with a piston chamber, a valve in said casing, and a piston in the piston chamber connected to said valve, a passageway through the piston and valve, a preliminary pressure valve for closing said passageway, a rod with a stop connected to the preliminary valve extending through the pasageway, and means connecting said rod to the open float.

In testimony whereof I have hereunto set my hand in presence of two subscribing witnesses.

JARARD W. LYTTON.

Witnesses:
EUNICE WHITEHORNE,
J. J. HENNESSY.

Copies of this patent may be obtained for five cents each, by addressing the "Commissioner of Patents, Washington, D. C."